Patented Mar. 5, 1946

2,396,098

UNITED STATES PATENT OFFICE 2,396,098

THERMOSETTING COMPOSITION

Joseph L. Haas, Framingham, Mass., assignor to Hodgman Rubber Company, Framingham, Mass., a corporation of Massachusetts No Drawing. Application December 3, 1942, Serial No. 467,786

16 Claims. (Cl. 260—19)

My present invention relates to the preparation of a novel composition which may be used to replace rubber for many purposes and may be processed in a manner analogous to the processing and vulcanizing of rubber. The composition is thermoplastic and may be processed and shaped by any of the conventional methods used by the rubber industries, and after being so processed or shaped can then be set by the further application of heat, or heat and pressure, whereby it acquires many of the properties of vulcanized rubber. The thermoplastic material can be compounded and mixed on a conventional two roll rubber mill or Banbury mixer and subsequently calendered, extruded, or pressed. Sheets and coated fabrics may be produced by the calender method commonly used in producing rubber coated sheets and rubber coated fabrics. Fabrics coated by the composition of the invention have been used to replace rubber coated fabrics in the manufacture of articles for Army and Navy, such as hospital sheeting, water bags, raincoats, poison gas impermeable fabric, etc. The composition of the invention possesses many properties similar to natural rubber such as flexibility, water resistance, and resistance to wear. It can be extruded into filaments, rods, tubes, or sheets and subsequently cured or it may be moulded by compression or injection and cured during these operations.

The thermo-setting composition of the invention comprises polyvinyl acetal resin, such as polyvinyl formal or butyral, with or without a plasticizer and a resin of the heat reactive type, preferably, an oil soluble thermosetting resin. By thermosetting resin, I mean a resin which can be rendered non-thermoplastic by heating and which, under heat, can react with other materials or with themselves. The addition of zinc oxide with or without a fatty acid, such as stearic, oleic, palmitic or lauric acid, or a salt of such materials, such as zinc stearate, is desirable. Pigments, colors, fillers, and reenforcing agents commonly used in rubber compounding may be added. These ingredients can be compounded and mixed on a conventional two roll rubber mill or a Banbury mixer. The resulting composition is plastic when heated and may be shaped as desired and the shaped mass then may be rendered non-thermoplastic by heating or curing at a suitable temperature and period of time. In general, the plasticizer used should be that one which is the best for use with the particular acetal used having in mind the product to be produced and its probable conditions of use.

The present invention in its broadest aspect contemplates a composition which is thermosetting. I believe I am the first to discover that by compounding polyvinyl acetal with a suitable amount of thermosetting resin a composition may be produced which can be thermoset by suitable heat treatment. I am aware that thermosetting resin has been added to polyvinyl acetal for the purpose of raising the melting or softening point of the composition particularly of a resin deposited from a solution as described in the patent to Hall and Smith, No. 2,243,560, but as far as I am aware no one has discovered that a polyvinyl acetal compounded with a thermosetting resin can be both softened by heat so that it can be molded and yet can be subsequently set by proper heat treatment. The fact that the composition is no longer thermoplastic after suitable heat treatment is evidence that some change in the character of the composition as a whole takes place during the heat treatment due to the presence of the thermosetting resin.

The following test is evidence that thermosetting or curing takes place by suitable heat treatment of the composition. A piece of fabric coated with the thermosetting compound is placed in a dry heat oven at a temperature of about 260° F., and subjected to various periods of heating. If the edge of the piece is folded to bring two portions of the coating together after a short period of heating, the two portions of the coating will fuse together and adhere to one another indicating that the coating is still thermoplastic. As the period of heating is increased and the thermosetting action progresses and becomes complete, two portions of the coating brought together by folding the edge of the piece as above described will no longer adhere and in fact cannot be used together even under pressure.

The action of zinc oxide and fatty acid in the composition appears to be somewhat analogous to the action of zinc oxide and stearic acid in conjunction with sulfur and modern rubber accelerators in the vulcanization of rubber. The zinc oxide and fatty acid appear to take part in the curing of the composition under heat, that is, in rendering the composition non-thermoplastic. While the thermosetting resin alone, when used in an amount of about 2 to 5 percent or more by weight based upon the weight of the polyvinyl acetal, will cause the composition to cure when subjected to suitable heat treatment, a better cure and better product is obtained when zinc oxide and a fatty acid also are present in the composition. Only small amounts of zinc oxide and stearic acid are required, such as about 2 percent by weight based on the weight of the acetal, but a greater amount of zinc oxide may be used since the excess acts as a reenforcing agent. Other materials may be used in place of zinc oxide, such as antimony oxide ($Sb_2O_3$), chromium oxide ($Cr_2O_3$) and tin oxide ($SnO$). The fatty acid appears to exert a solubilizing action upon the metallic oxide.

The following tests of compositions with and without metallic oxides serve to illustrate the effect of metallic oxides on the cure. 100 parts of standard high viscosity polyvinyl butyral resin were mixed with 50 parts of butyl ricinoleate and 17 parts of Wecoline S. C. plasticizer. This mass was then extruded through a 20 mesh screen to remove all coarse particles. Three separate portions of the strained weld were then mixed in a small Banbury mixer with 10 parts of Amberol resin ST 137 and in one portion adding 3 parts stearic acid and 10 parts of a metallic oxide and in another portion adding an additional 10 parts of metallic oxide, all per 100 parts of the butyral resin. In each case the final mix was pressed into a block and 0.005 inch gauge sheets were skived off. The sheets were heated on a metal plate in circulating air at 275° for various times and then tested for flow in a Tinius-Olsen flow tester at 225° F., under a pressure of 100 pounds per square inch. A plastic pellet from each heated sheet was placed in the heated chamber of the tester and forced through an orifice of the tester by a ram. The distance in inches that the plastic flowed beyond the orifice in two minutes was recorded as the flow. A flow of less than 0.15 inch generally means that the material is completely cured.

The following table indicates the data determined.

|  | Metallic oxide | | | |
| --- | --- | --- | --- | --- |
|  | None | 10 pts. ZnO | 20 pts. ZnO | 10 pts. MgO |
| Flow after 15 min. at 275° F. (inches in 2 min.) | 0.92 | 0.15 | 0.10 | 0.70 |
| Flow after 30 min. (inches in 2 min.) | 0.76 | None | None | 0.22 |
| Flow after 50 min. (inches in 2 min.) | 0.30 | None | None | 0.08 |

The action of the thermo-setting resin in the composition of the invention varies depending upon its character and the amount used. Of the many types that may be employed, for example, the phenol aldehydes and the amino aldehydes, such as the urea aldehydes and melamine aldehyde resins, I find the so-called 100% oil soluble resins known as the para-tertiary substituted phenolaldehyde resins to be particularly advantageous from the standpoint of the quality of the final product as well as ease of manipulation and processing. In the manufacture of flexible matrials, for instance, raincoat fabric and when oil soluble thermosetting resins are employed, I find that from 5% to 20% of the thermosetting resin should be employed, since less than 5% fails to overcome the thermoplastic characteristics of the polyvinyl acetal and as the amount is increased above 20% stiffening of the product begins and becomes too stiff when 40% is used. However, when rigid products are desired larger amounts may be used and when non-oil-soluble thermosetting resins, for instance, melamine aldehyde resins, are employed a smaller amount, even as little as 2%, may in some instances, be found to be effective. In general, the non-oil soluble heat reactive resins appear to be so quickly thermosetting that difficulties from premature curing are likely to be experienced.

In a composition for coating fabrics where flexibility is of primary importance, such as in raincoat fabric, I prefer to employ about 5 to 20 percent of an oil soluble resin produced by reacting an aldehyde with the synthesized para substituted alkyl or aryl phenols. Examples of these are Amerol ST 137 as produced by the Resinous Product Co., Philadelphia, Pa., or Super Beckacite 1001 as produced by Reichold Chemicals of Detroit, Michigan, which are para substituted alkyl phenol-aldehyde resins of Bakelite #3360 as produced by the Bakelite Corp., Bound Brook, New Jersey, which is a para substituted aryl phenol aldehyde resin.

A suitable composition for use in making raincoat fabric comprises:

| | Parts by weight |
| --- | --- |
| Partial polyvinyl butyral | 48 |
| Butyl ricinoleate | 24 |
| Wecoline S. C. plasticizer (which I understand is triethylene dicaprylate with diesters of other fatty acids) | 8 |
| P-tertiary butyl phenol formaldehyde resin | 5 |
| Zinc oxide | 10 |
| Stearic acid | 0 to 1 |
| Pigment or filler | 4 |

The partial polyvinyl butyral used contained between 1 to 3 percent of acetate groups calculated as vinyl acetate and between 18 to 28 percent of hydroxyl groups calculated as vinyl alcohol, the remainder being butyral groups.

The polyvinyl acetal and plasticizer are mixed by dry churning which produces a moist crumb composition. This is allowed to stand at room or slightly higher temperature until it forms a soiled cake. This cake can be cut into slabs like natural rubber and weighed out in this form. This is put on a two roll mill and when a continuous plastic layer is formed around the mill rolls, the other ingredients are added. A coating of the resulting composition is applied to a fabric by either the spread or calendering methods or both, commonly used in coating fabric with rubber. Preferably, an initial thin coating is applied to the fabric by the spread method by passing a web of fabric over a roll while a solution of the composition in the form of a paste is deposited upon the web and is spread thereon by a doctor blade. The coated fabric then is caused to pass over a heater to remove the solvent. The solvent used may be denatured alcohol or isopropanol 25 to 50 parts mixed with 75 to 50 parts of solvent naphtha or toluol.

A heavier final coating then is applied by the calendering method by passing the web of fabric between a pair of calender rolls heated to a temperature of about 180° F. to 200° F. and which are operatively associated with a pair of delivering rolls heated to a temperature between 180° F. to 230° F. The composition is fed between the delivering rolls which forms it into a plastic sheet or web. The plastic web is delivered onto the adjacent calender roll which applies it progressively to the fabric web as the latter passes between the calendering rolls. As the coated fabric leaves the calender it may be dusted or finished, if desired, with any of the conventional dusting agents used by the rubber industry, such as talc, mica, cornstarch.

The raincoat is tailored from the resulting raincoat fabric, the seams being secured by cementing or the assembly may be made by stitching the various parts and subsequently cementing and strapping the seams. The raincoats then are cured by hanging for 1 to 1½ hours is an oven heated to between 250° to 270° F. to thermo-set the coating and permanently unite the seams. The fabric of the finished article possesses a flexibility and resistance to water and wear like that of a fabric coated with vulcanized natural rubber.

A composition suitable for use in making water bag fabric comprises:

| | Parts by weight |
|---|---|
| Partial polyvinyl butyral (same as in previous example) | 36 |
| Methyl ricinoleate | 24 |
| p-Tertiary butyl phenol formaldehyde | 4 |
| Zinc oxide | 10 |
| Stearic acid | 1 |
| Titanium dioxide | 20 |
| Whiting | 5 |

The composition produced by intimately mixing the ingredients of this formula in a two roll mill or Banbury mixer is thermoplastic and thermo-setting and can be used to coat fabric by the spread and calendering methods commonly used in coating fabric with natural rubber. The coated fabric can be used to produce water bags and the coating can be thermo-set by curing as described in making raincoats.

A composition suitable for extrusion into the form of hose:

| | Parts by weight |
|---|---|
| Partial polyvinyl butyral | 45 |
| Dibutyl sebacate | 15 |
| Amberol ST 137 resin | 5 |
| Antimony oxide | 10 |
| Lauric acid | 1 |
| Chromium green | 9 |
| Clay | 15 |

This composition is compounded and mixed as described in the examples and then extruded on a conventional rubber or plastic extruder in any shape that may be desired. It may thereafter be "cured" or caused to be thermo-set by any of the conventional heat curing methods.

A composition suitable for making rubber heels:

| | Parts by weight |
|---|---|
| Partial polyvinyl butyral | 45 |
| Dibutyl sebacate | 25 |
| Beckacite 1001 resin | 5 |
| Zinc oxide | 10 |
| Stearic acid | 1 |
| Channel carbon black | 14 |

This composition is compounded and mixed as in the examples previously given, taken off the mill in slab form, dinked out to an appropriate size to fit the moulds and cured in a mould under heat and pressure as is ordinarily done with rubber.

A composition suitable for coating fabric to provide a gas impervious coated fabric may comprise:

| | Parts by weight |
|---|---|
| Partial polyvinyl butyral | 36 |
| Butyl ricinoleate | 18 |
| Wecoline S. C. plasticizer (which I understand is triethylene dicaprylate with diesters of other fatty acids) | 6 |
| p-Tertiary butyl phenol formaldehyde resin | 6 |
| Zinc oxide | 8 |
| Stearic acid | ½ |
| Pigment | 13½ |
| Whiting | 10½ |
| Paraffin wax | 1½ |

This composition is compounded and used in the same manner described in the previous examples.

Another similar composition using polyvinyl formal may comprise:

| | Parts by weight |
|---|---|
| Partial polyvinyl formal | 40 |
| Dibutyl tartrate | 15 |
| Dibutyl phthalate | 15 |
| Stearic acid | ¾ |
| Zinc oxide | 5 |
| p-Tertiary butyl phenol formaldehyde resin | 5 |
| Whiting | 19 |
| Color | ¼ |

Although zinc oxide, and fatty acids greatly improve curing and the qualities of the cured product, their presence is not essential although highly desirable. In making transparent coatings on silk or the like where a very transparent coating is desired, the zinc oxide or its equivalent and fatty acid as well as pigments and fillers may be entirely eliminated. If the advantages obtained by using metallic oxide and fatty acid were desired in such a transparent coating, the fatty acid salts of the metals may be used inasmuch as they do not materially effect transparency. Examples of such fatty acid salts are zinc stearate and zinc laurate.

Hospital sheeting may be produced by coating fabric with the following composition by the calender method, the coated material thereafter being rendered thermo-setting by washing with a solution of a non-oil soluble thermosetting resin.

| | Parts by weight |
|---|---|
| Partial polyvinyl butyral | 36 |
| Butyl ricinoleate | 18 |
| Wecoline S. C. plasticizer (which I understand is triethylene dicaprylate with diesters of other fatty acids) | 6 |
| Zinc oxide | 10 |
| Titanium dioxide | 10 |
| Stearic acid | 1½ |
| Whiting | 18½ |

As the fabric coated with the above composition leaves the calender rolls at a rate of from 15 to 30 yards per minute, it is caused to pass under a doctor blade which forms a trough with the sheet material to receive a solution of Melmac resin S72 in butanol. The solution of Melmac resin used contained 2 parts of butanol and 1 part of a viscous melamine-aldehyde resin solution in butanol of honey-like consistency as purchased from the manufacturer. This solution diffused into the coating and, since the coating was still hot, the solvent was removed by the heat therein. The sheet material then was heated until the coating was no longer thermoplastic.

Another composition suitable for coating sheet material by the calender method comprises:

| | Parts by weight |
|---|---|
| Partial polyvinyl butyral | 48 |
| Butyl ricinoleate | 24 |
| Wecoline S. C. plasticizer (which I understand is triethylene dicaprylate with diesters of other fatty acids) | 8 |
| Resinox 602 (a molding type phenolic resin) | 5 |
| Zinc oxide | 10 |
| Stearic acid | 1 |
| Pigment or filler | 4 |

In my co-pending application Serial No. 467,787, filed December 3, 1942, I have described and claimed a sheet material coated with the composition of the invention as well as the method of making the same.

I claim:

1. A thermosetting composition capable of being compounded and processed like natural rubber compounds comprising a plasticized polyvinyl butyral, a heat hardening resin capable of reacting with a polyvinyl butyral in an amount between about 2 and 20 per cent of the weight of the butyral and zinc oxide as an accelerator of said reaction in an amount of about 2 to 27 per cent of the weight of the butyral, said resin being selected from the group consisting of an aryl substituted phenol aldehyde resin and an alkyl substituted phenol aldehyde resin.

2. A thermosetting composition capable of being compounded and processed like natural rubber compounds comprising a plasticized polyvinyl butyral, a heat hardening resin capable of reacting with a polyvinyl butyral in an amount between about 2 and 20 per cent of the weight of the butyral and zinc oxide as an accelerator of said reaction in an amount of about 2 to 27 per cent of the weight of the butyral together with stearic acid in an amount between about 1½ to 3 per cent of the weight of the butyral, said resin being selected from the group consisting of an aryl substituted phenol aldehyde resin and an alkyl substituted phenol aldehyde resin.

3. A rubber-like product which is not self adhesive at 260° F. and which is the reaction product produced by heating a mixture of a plasticized polyvinyl butyral, a heat hardening resin capable of reacting with a polyvinyl butyral in an amount between 2 and 20 per cent of the weight of the butyral and zinc oxide as an accelerator of said reaction in an amount of about 2 to 27 per cent of the weight of the butyral, said resin being selected from the group consisting of an aryl substituted phenol aldehyde resin and an alkyl substituted phenol aldehyde resin.

4. A rubber-like product which is not self adhesive at 260° F. and which is the reaction product produced by heating a mixture of a plasticized polyvinyl butyral, a heat hardening resin capable of reacting with a polyvinyl butyral in an amount between 2 and 20 per cent of the weight of the butyral and zinc oxide as an accelerator of said reaction in an amount of about 2 to 27 per cent of the weight of the butyral together with stearic acid in an amount between about 1½ to 3 per cent of the weight of the butyral, said resin being selected from the group consisting of an aryl substituted phenol aldehyde resin and an alkyl substituted phenol aldehyde resin.

5. A thermosetting composition according to claim 1 wherein the heat hardening resin is an aryl substituted phenol aldehyde resin.

6. A thermosetting composition according to claim 1 wherein the heat hardening resin is an alkyl substituted phenol aldehyde resin.

7. A thermosetting composition according to claim 2 wherein the heat hardening resin is an aryl substituted phenol aldehyde resin.

8. A thermosetting composition according to claim 2 wherein the heat hardening resin is an alkyl substituted phenol aldehyde resin.

9. A rubber-like product according to claim 3 wherein the heat hardening resin is an aryl substituted phenol aldehyde resin.

10. A rubber-like product according to claim 3 wherein the heat hardening resin is an alkyl substituted phenol aldehyde resin.

11. A rubber-like product according to claim 4 wherein the heat hardening resin is an aryl substituted phenol aldehyde resin.

12. A rubber-like product according to claim 4 wherein the heat hardening resin is an alkyl substituted phenol aldehyde resin.

13. A sheet material having a coating which is a mixture according to claim 1.

14. A sheet material having a coating which is a mixture according to claim 2.

15. A sheet material having a coating which is a reaction product according to claim 3.

16. A sheet material having a coating which is a reaction product according to claim 4.

JOSEPH L. HAAS.